United States Patent [19]

Young et al.

[11] Patent Number: 5,552,685
[45] Date of Patent: Sep. 3, 1996

[54] APPARATUS AND METHOD FOR DETECTION AND CONTROL OF CIRCULATING CURRENTS IN A VARIABLE SPEED DC MOTOR

[75] Inventors: Glen C. Young, Fort Wayne; Guy Bonner, Jr., Huntington; Eric D. Schneider, Carmel, all of Ind.

[73] Assignee: General Electric Company, Fort Wayne, Ind.

[21] Appl. No.: 219,022

[22] Filed: Mar. 28, 1994

Related U.S. Application Data

[63] Continuation-in-part of Ser. No. 108,328, Aug. 18, 1993, Pat. No. 5,423,192.

[51] Int. Cl.⁶ .................................................... H02P 5/40
[52] U.S. Cl. .................... 318/254; 318/138; 318/801; 318/268; 62/228.4; 62/215
[58] Field of Search ............................... 318/138, 254, 318/700–832; 388/800–810; 62/228.4, 215

[56] References Cited

U.S. PATENT DOCUMENTS

| | | | |
|---|---|---|---|
| 3,048,006 | 8/1962 | Goodman . | |
| 3,137,125 | 6/1964 | Kyryluk . | |
| 3,936,652 | 2/1976 | Levine . | |
| 4,015,182 | 3/1977 | Erdman | 318/334 |
| 4,018,543 | 4/1977 | Carson et al. . | |
| 4,047,083 | 9/1977 | Plunkett | 318/231 |
| 4,118,636 | 10/1978 | Christian . | |
| 4,167,693 | 9/1979 | Liska et al. | 318/138 |
| 4,224,528 | 9/1980 | Argo . | |
| 4,250,435 | 2/1981 | Alley et al. | 318/138 |
| 4,250,544 | 2/1981 | Alley | 364/110 |
| 4,275,309 | 6/1981 | Lucier . | |
| 4,291,265 | 9/1981 | Kawada et al. | 318/782 |
| 4,314,191 | 2/1982 | Kawada et al. | 318/802 |
| 4,346,434 | 8/1982 | Morinaga | 364/183 |
| 4,359,870 | 11/1982 | Holton, Sr. . | |
| 4,390,826 | 6/1983 | Erdman et al. | 318/439 |
| 4,415,844 | 11/1983 | Mendenhall et al. | 318/254 |
| 4,418,308 | 11/1983 | Bose | 318/803 |
| 4,433,544 | 2/1984 | Wells et al. . | |
| 4,452,046 | 6/1984 | Valentin . | |
| 4,459,519 | 7/1984 | Erdman | 318/254 |
| 4,477,762 | 10/1984 | Kurakake et al. | 318/802 |
| 4,495,450 | 1/1985 | Tokizaki et al. | 318/138 |

(List continued on next page.)

FOREIGN PATENT DOCUMENTS

| | | |
|---|---|---|
| 164912 | 4/1954 | Australia . |
| 129274 | 8/1982 | Japan . |
| 8703433 | 4/1987 | WIPO . |

OTHER PUBLICATIONS

Soviet Patent Abstracts, S–X sections, week 8945, Dec. 20, 1989.

*Primary Examiner*—Paul Ip
*Attorney, Agent, or Firm*—Ralph E. Krishner, Jr.

[57] ABSTRACT

A current regulation circuit for a motor. The motor includes a stationary assembly having windings adapted for energization in at least one preselected sequence and a rotatable assembly in magnetic coupling relation to the stationary assembly. A power supply link connects the windings to a power supply and includes power switching devices for selectively energizing the windings in the preselected sequence by selectively connecting the power supply link to the windings to produce an electromagnetic field for rotating the rotatable assembly. The power switching devices each have a conducting state and a nonconducting state. The current regulation circuit includes a timing circuit, a current sensing circuit and a control circuit. The timing circuit defines preset periods during which each of the power switching devices may be nonconducting. The current sensing circuit senses current in the power supply link. The control circuit controls the power switching devices so that each of the power switching devices is nonconducting when the sensed current exceeds a peak current reference level during the preset periods. In this manner, the current regulation circuit controls current which circulates during periods when only one power switching device is conducting.

52 Claims, 7 Drawing Sheets

U.S. PATENT DOCUMENTS

| | | | |
|---|---|---|---|
| 4,500,821 | 2/1985 | Bitting et al. | 318/254 |
| 4,528,486 | 7/1985 | Flaig et al. | 318/254 |
| 4,540,921 | 9/1985 | Boyd, Jr. et al. | 318/254 |
| 4,595,865 | 6/1986 | Jahns | 318/254 |
| 4,636,936 | 1/1987 | Boyd, Jr. et al. | 364/148 |
| 4,642,536 | 2/1987 | Boyd, Jr. et al. | 318/254 |
| 4,642,537 | 2/1987 | Young | 318/254 |
| 4,648,551 | 3/1987 | Thompson et al. | 236/49 |
| 4,649,331 | 3/1987 | Jahns | 318/798 |
| 4,653,285 | 3/1987 | Pohl | 62/126 |
| 4,667,480 | 5/1987 | Bessler | 62/180 |
| 4,669,040 | 5/1987 | Pettit et al. | 318/610 X |
| 4,669,405 | 6/1987 | Resta et al. | 112/121.14 |
| 4,678,973 | 7/1987 | Elliott et al. | 318/254 |
| 4,688,547 | 8/1987 | Ballard et al. | 126/116 A |
| 4,712,050 | 12/1987 | Nagasawa et al. | 318/254 |
| 4,722,018 | 1/1988 | Pohl | 361/22 |
| 4,736,143 | 4/1988 | Nakamura et al. | 318/432 |
| 4,743,815 | 5/1988 | Gee et al. | 318/254 |
| 4,752,724 | 6/1988 | Radziwill et al. | 318/254 |
| 4,754,405 | 6/1988 | Foster | 364/557 |
| 4,757,241 | 7/1988 | Young | 318/254 |
| 4,763,347 | 8/1988 | Erdman | 318/254 |
| 4,806,839 | 2/1989 | Nagato et al. | 318/798 |
| 4,860,231 | 8/1989 | Ballard et al. | 364/571 |
| 4,868,467 | 9/1989 | Davis | 318/254 |
| 4,876,491 | 10/1989 | Squires et al. | 318/138 |
| 4,879,502 | 11/1989 | Endo et al. | 318/723 |
| 4,896,089 | 1/1990 | Kliman et al. | 318/701 |
| 4,902,952 | 2/1990 | Lavery | 318/645 |
| 4,935,639 | 6/1990 | Yeh . | |
| 4,950,918 | 8/1990 | O'Breartuin et al. | 307/242 |
| 4,952,853 | 8/1990 | Archer | 318/254 |
| 4,958,269 | 9/1990 | Gritter | 364/153 |
| 4,959,596 | 9/1990 | MacMinn et al. | 318/254 |
| 4,992,715 | 2/1991 | Nakamura et al. | 318/649 |
| 5,045,988 | 9/1991 | Gritter et al. | 363/35 |
| 5,107,685 | 4/1992 | Kobayashi | 62/115 |
| 5,119,071 | 6/1992 | Takezawa et al. | 318/130 |
| 5,170,344 | 12/1992 | Berton et al. | 364/400 |
| 5,172,036 | 12/1992 | Cameron | 318/138 |
| 5,202,951 | 4/1993 | Doyle | 388/811 |
| 5,221,881 | 6/1993 | Cameron | 318/254 |
| 5,233,275 | 8/1993 | Danino | 318/254 |
| 5,254,926 | 10/1993 | Miller et al. | 318/798 |
| 5,259,211 | 11/1993 | Ikeda | 62/228.4 |
| 5,282,723 | 2/1994 | Bellomo | 417/45 |
| 5,285,029 | 2/1994 | Araki | 187/114 |
| 5,287,045 | 2/1994 | Uehara | 318/268 |
| 5,306,988 | 4/1994 | Carobolante et al. | 318/254 |

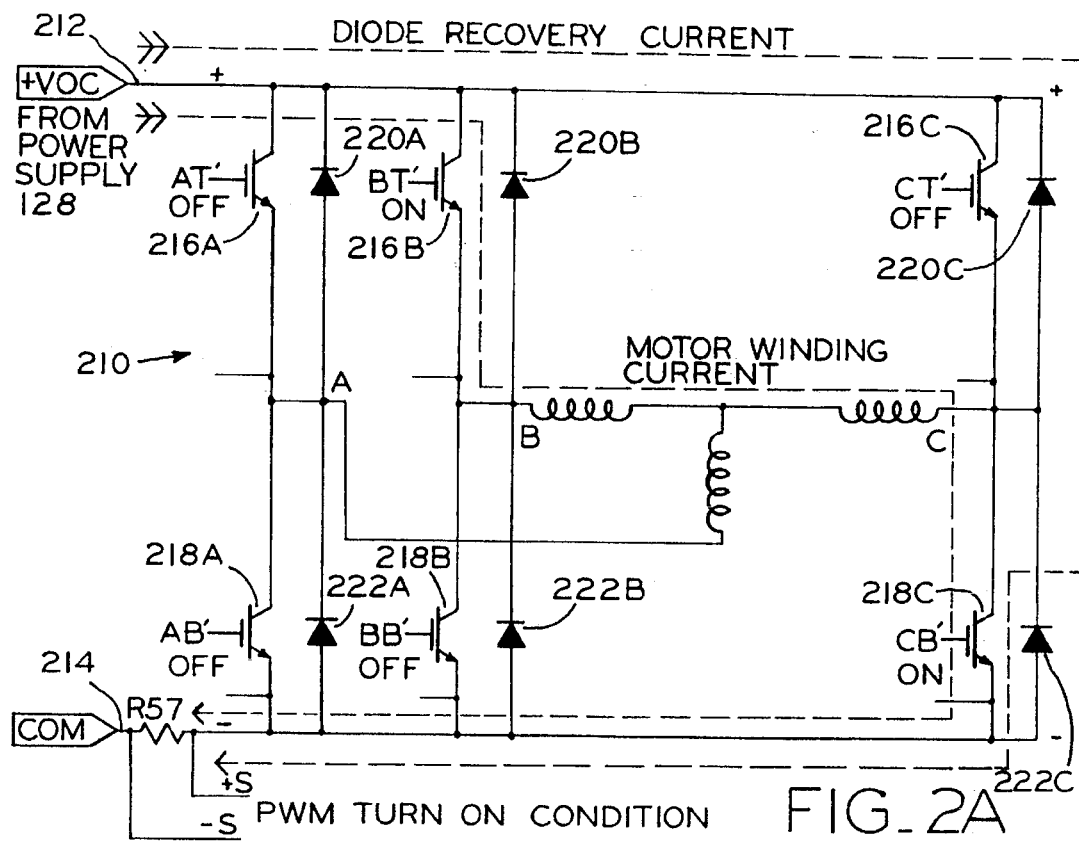
FIG_2A
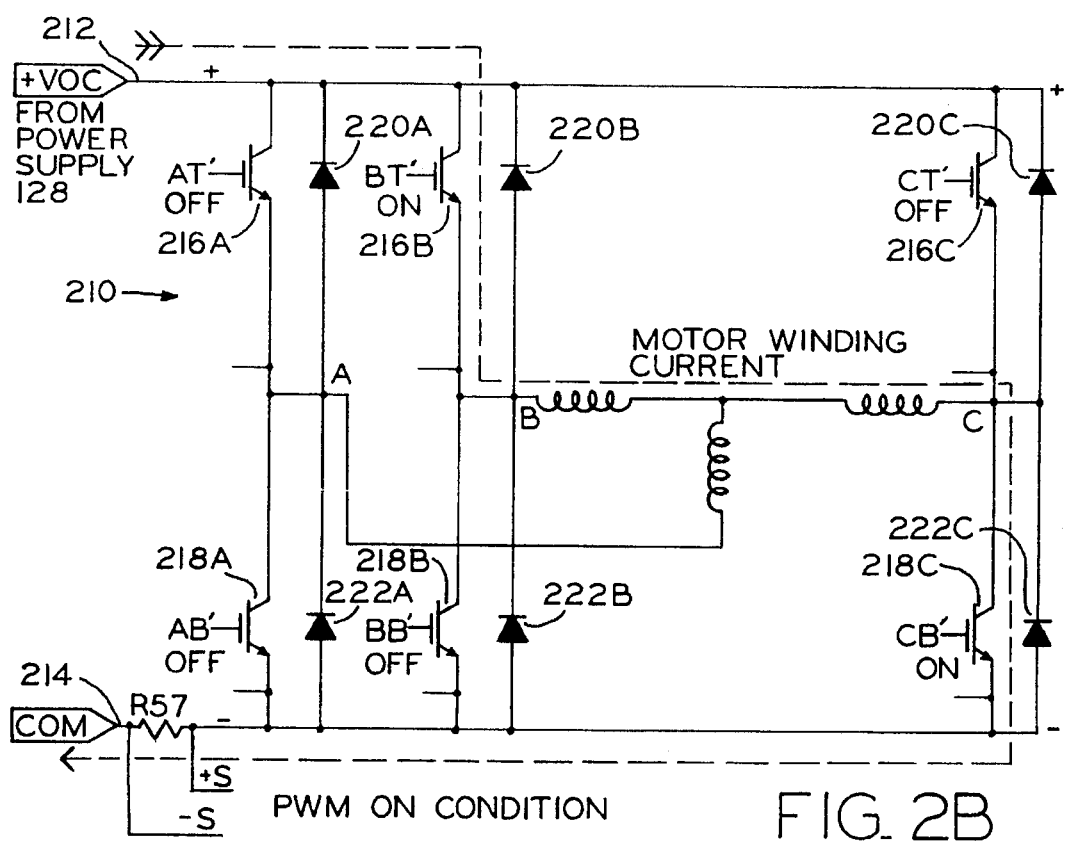
FIG_2B

BI-DIRECTIONAL CURRENT COMPARATOR 140

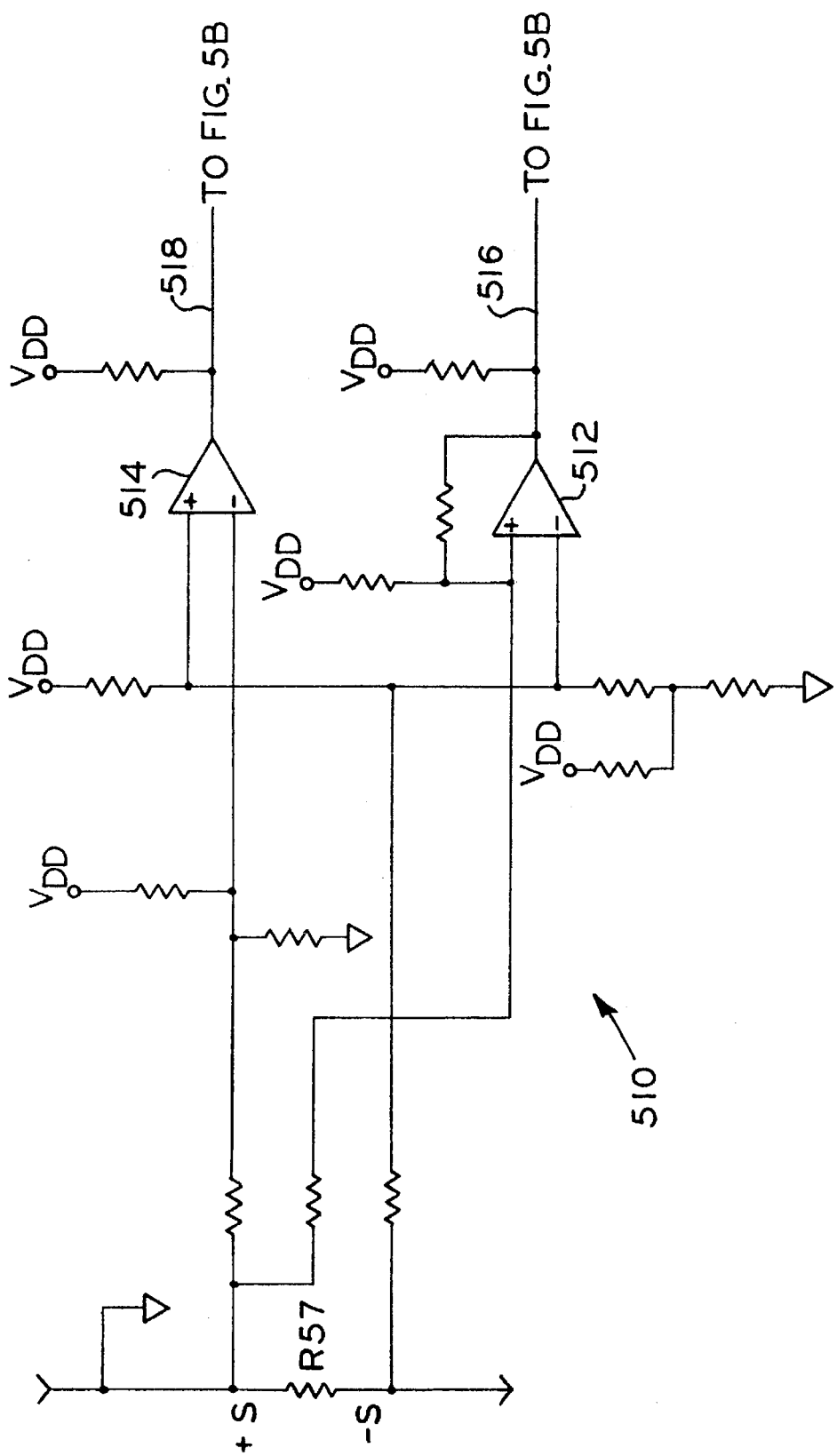
FIG._5A

APPARATUS AND METHOD FOR DETECTION AND CONTROL OF CIRCULATING CURRENTS IN A VARIABLE SPEED DC MOTOR

CROSS-REFERENCE TO RELATED APPLICATION

This application is a continuation-in-part of the commonly assigned application Ser. No. 08/108,328 filed Aug. 18, 1993, the entire disclosure of which is incorporated herein by reference.

BACKGROUND OF THE INVENTION

This invention generally relates to any controllable motor and to a current regulation circuit for controlling circulating currents in the motor and, particularly, to a current regulation circuit for detecting and controlling circulating currents in a controllable, variable speed motor with a bi-directional current sensing circuit.

A motor system according to the present invention typically includes a brushless DC motor having an inverter bridge for driving the motor. The inverter bridge has a number of power switching devices with a flyback diode coupled to each of the devices and is used to connect the motor's windings to a power supply through a power supply link. The power supply link has positive and negative rails connecting the motor to the power supply. Generally, two windings of a three-phase motor are energized at a time and the power is pulse width modulated for control purposes. Such a motor system provides pulse width modulation (PWM) of the power to the windings by turning on and off one of the power switching devices. Under the normal PWM control scheme, the motor system turns off one device at a time which causes a flyback current to circulate in the inverter bridge. Such circulating currents result from energy stored in the phase winding inductances and flow through one power device and one diode in the inverter bridge. In normal operation, circulating currents decay rapidly because the motor back electromotive force (EMF) opposes their flow. In abnormal operation, however, circulating currents are out of position and the back EMF voltage causes them to increase rather than to decay which can result in damage to the current-carrying power devices as well as to the motor's permanent magnets. A momentary reversal of rotation at start-up or being out of position due to a failure to properly sense rotor position are examples of abnormal operation causing increasing circulating currents.

Generally, current sensors are required in all phases of the motor to determine what currents are in the motor. Further, systems employing only a single current sensing element are unable to detect circulating currents because they cannot be observed in a shunt resistor (or other current sensor) in the power supply link.

Brushless DC motors are disclosed in U.S. Pat. No. 4,757,241 and application Ser. No. 08/108,328, filed Aug. 18, 1993, both of which are commonly assigned with the present application and the entire disclosures of which are incorporated herein by reference in their entirety.

SUMMARY OF THE INVENTION

Among the several objects of this invention may be noted the provision of an improved current regulation circuit for a motor which permits use of a single current sensing element; the provision of such a current regulation circuit which permits detection and control of abnormal circulating currents in the motor; the provision of such a current regulation circuit which prevents false indications of abnormal circulating currents due to diode recovery currents; the provision of such a current regulation circuit which provides overcurrent protection from abnormal circulating currents without having continuous knowledge of the motor winding currents; and the provision of such a current regulation circuit which is economically feasible and commercially practical.

Briefly described, a motor according to the present invention includes a stationary assembly having windings adapted for energization in at least one preselected sequence and a rotatable assembly in magnetic coupling relation to the stationary assembly. A power supply link connects the windings to a power supply and includes power switching devices for selectively energizing the windings in the preselected sequence by selectively connecting the power supply link to the windings to produce an electromagnetic field for rotating the rotatable assembly. The power switching devices each have a conducting state and a nonconducting state. The current regulation circuit includes a timing circuit, a current sensing circuit and a control circuit. The timing circuit defines preset periods during which each of the power switching devices may be nonconducting. The current sensing circuit senses current in the power supply link. The control circuit controls the power switching devices so that each of the power switching devices is nonconducting when the sensed current exceeds a peak current reference level during the preset periods. In this manner, the current regulation circuit controls current which circulates during periods when only one power switching device is conducting.

In another form, the invention is directed to a method of operating a system for driving a rotatable component. The system comprises a motor including a stationary assembly having windings adapted for energization in at least one preselected sequence and a rotatable assembly in magnetic coupling relation to the stationary assembly. The rotating assembly is in driving relation with the rotatable component. A power supply link connects the windings to a power supply and includes power switching devices each having a conducting state and a nonconducting state. The method includes the step of selectively energizing the windings in the preselected sequence by connecting the power supply link to the windings to produce an electromagnetic field for rotating the rotatable assembly. Further, the method includes regulating current by defining preset periods during which each of the power switching devices may be nonconducting, sensing current in the power supply link and controlling the power switching devices so that each of the power switching devices is nonconducting when the sensed current exceeds a peak current reference level during the preset periods.

Alternatively, the invention may comprise various other systems and methods.

Other objects and features will be in part apparent and in part pointed out hereinafter.

BRIEF DESCRIPTION OF THE DRAWINGS

FIGS. 2A–D illustrate currents in an inverter bridge driving the motor of FIG. 1 according to the invention.

FIGS. 5A–B illustrate another preferred embodiment of the invention including an alternative bi-directional current comparator circuit and including an alternative control circuit according to the invention.

Corresponding reference characters indicate corresponding parts throughout the drawings.

DETAILED DESCRIPTION OF PREFERRED EMBODIMENTS

Figure 1:
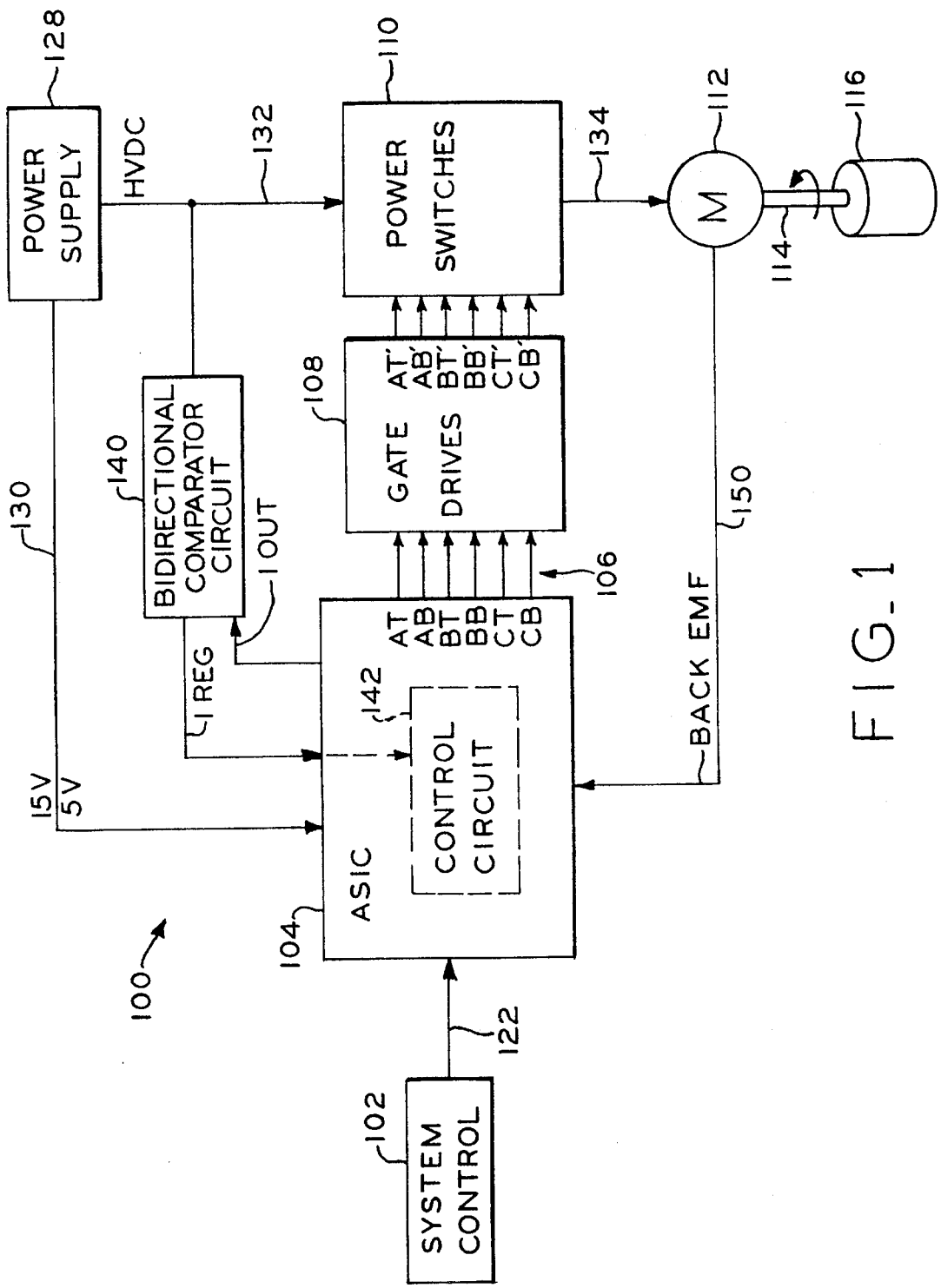
FIG. 1 is a block diagram of one preferred embodiment of a variable speed motor drive system of the invention and including a bi-directional current comparator circuit and a control circuit according to the invention.

FIG. 1 shows a system 100 according to one preferred embodiment of the present invention. The system 100 includes a system control 102 which provides system control signals, such as a temperature signal, to an application specific integrated circuit (ASIC) 104. The ASIC 104 may be alternatively embodied as a universal electronically commutated motor integrated circuit (UECM IC, not shown). ASIC 104 provides gate drive signals via lines 106 for electronically controlling a plurality of gate drives 108 which provide enough voltage to switch a plurality of power switches 110. Preferably, the gate drives 108 provide voltage signals shifted from 5 volts to 15 volts for driving the power switches 110 and condition the signals provided from ASIC 104 via line 106 for optimal operation of power switches 110. In turn, power switches 110 control rotation in any controllable, motor 112—such motors include a variable speed motor, such as a brushless DC motor, including an electronically commutated motor, or a switched reluctance motor.

The motor 112 of the present invention has a stationary assembly, or stator (not shown), and a rotatable assembly, or rotor (not shown). The rotatable assembly is in magnetic coupling relation to the stationary assembly and is mechanically connected via a shaft 114 to a particular device to be driven, such as a rotatable component 116. In order to control the speed of the component 116, system 100 controls the speed of motor 112 by controlling the power delivered to the load. Preferably, system 100 regulates torque to obtain the desired motor speed by matching the load and motor loss demand torque at the desired speed.

A power supply 128 provides power via line 130 to operate ASIC 104 which drives power switches 110 by gate drives 108. The power supply 128 also provides high voltage DC power via line 132 to power switches 110 for commutating the windings included in the stationary assembly of motor 112. Power switches 110 selectively provide power via line 134 to the windings of motor 112 in at least one preselected sequence by switching the power supply 128 in connection with the windings. As such, lines 132 and 134 in combination with power switches 110 constitute a power supply link for connecting power supply 128 to the windings of motor 112.

According to the invention, ASIC 104 generates a commutation signal which causes system 100 to produce a peak current that matches the load torque demand in response to a peak current reference signal 1OUT. Matching torque load with produced torque causes motor 112 to operate at a desired speed. The commutation signal includes a series of commutation pulses wherein each pulse causes a corresponding switching event of power switches 110. The windings are adapted to be commutated in at least one preselected sequence and power switches 110 selectively provide power to the windings of motor 112 in the preselected sequence.

Current flow in the windings produce an electromagnetic field for rotating the rotating assembly of motor 112. ASIC 104 preferably controls the speed of motor 112 which in turn controls the speed of component 116.

In a preferred embodiment of the invention, power switches 110 consist of an inverter bridge which has a plurality of switches and corresponding flyback diodes (shown in detail in FIGS. 2A–D). ASIC 104 commands two of three windings of motor 112 to be energized at a time and pulse width modulates the power being applied to the energized windings for control purposes. System 100 provides pulse width modulation (PWM) control of the power to the windings by turning on and off one of power switches 110. By doing so, the PWM control scheme of system 100 causes a flyback current to circulate when only one of power switches 110 and one flyback diode are conducting.

As shown in FIG. 1, system 100 also includes a bi-directional current comparator circuit 140 for sensing current in the power supply link. The bi-directional current comparator 140 cooperates with a control circuit 142 resident in ASIC 104 for regulating current in system 100. Particularly, the control circuit 142 and bi-directional comparator 140 regulate circulating currents in the inverter bridge during periods when only one of power switches 110 is conducting. FIG. 1 illustrates bi-directional comparator 140 external to ASIC 104 and control circuit 142 internal to ASIC 104. Alternatively, both circuits may be either external or internal to ASIC 104.

FIG. 1 further illustrates that ASIC 104 receives a signal via line 150 from motor 112 representative of a back electromotive force (EMF) in the windings. In a preferred embodiment, the back EMF signal provides information relating to detection of zero crossings for sensing the position the rotating assembly of motor 112. Preferably, each of the commutation pulses of the commutation signal corresponds to a zero crossing. As described above, motor 112 has two of its three windings energized at any given time during operation for developing torque. ASIC 104 selects the unenergized winding for position sensing by observing the motor phase back EMF waveforms when current in the selected phase has decayed to zero. A back EMF sensing network (not shown) detects the zero crossings of the difference between the back EMF voltage of the selected winding of motor 112 as compared to a reference level. The reference level is, for example, the sum of the voltages of the energized windings.

ASIC 104 preferably determines rotor position as a function of the zero crossings and generates commutation signals in response thereto. The commutation instances of a motor phase are determined from the information about the zero crossings of back EMF in that phase. Torque production in a phase of motor 112 is determined by the product of the current in the phase and the back EMF of that phase. It is necessary to energize a winding of motor 112 when the back EMF has crossed zero in the direction that will oppose the voltage energizing the winding to sustain positive torque. At low speeds, for example, it is convenient to energize a winding of motor 112 when it is experiencing maximum rotor flux.

Commonly assigned U.S. patent application Ser. No. 08/108,328, the entire disclosure of which is incorporated by reference herein in its entirety, describes a preferred means for detecting zero crossings. In order to detect zero crossings, ASIC 104 includes a multiplexer circuit (not shown) for multiplexing the back EMF signal (received via line 150). ASIC 104 compares the multiplexed signal to the reference level input signal to obtain a comparison signal. A noise timer (not shown) filters the comparison signal before it is input to a position sensing circuit (not shown). The position sensing circuit provides a zero crossing detector signal to which ASIC 1.04 responds. ASIC 104 controls commutation as a function of the elapsed time between commutations and zero crossings and generates gate drive signals at lines 106 for driving power switches 110 in response to the position sensing.

As shown in FIGS. 2A–D, power switches 110 are part of a three-stage full-bridge inverter 210 having a positive rail 212 and a negative rail 214 supplied by power supply 128. Preferably, power switches 110 of the inverter bridge 210 include three upper switches 216A, 216B and 216C and three lower switches 218A, 218B and 218C. Flyback diodes 220A, 220B and 220C and 222A, 222B and 222C are coupled in an anti-parallel relationship with each switch of switches 216A–C and 218A–C, respectively. Each phase connects to power supply 128 through one of upper switches 216A–C and one of lower switches 218A–C. In the illustrated embodiment, one switch is closed for each winding of motor 112 to be energized so that power switches 110 are activated in pairs. Power switches 216A and 218A correspond to phase A; power switches 216B and 218B correspond to phase B; and power switches 216C and 218C correspond to phase C.

A preferred excitation scheme for motor 112 involves three-phase excitation with trapezoidal current excitation. Two switches are commanded on during each motoring interval, one from the upper set of switches 216A–C and one from the lower set of switches 218A–C. Current flows in only two of the three motor phases during each excitation interval. ASIC 104 selects which of upper switches 216A–C and lower switches 218A–C is to be used to pulse width modulate the power applied to the windings of motor 112 at a given time.

Phase currents of motor 112 can be sensed using shunt resistors, current transformers, Hall-effect current sensors or other sensors or circuits. As shown in FIGS. 2A–D, a shunt resistor R57 is placed in the negative rail 214 of inverter bridge 210. Motor phase currents only flow through the shunt resistor R57 when power is being exchanged from power supply 128 to motor 112 and vice versa. Although shunt R57 senses motor phase currents, it cannot directly detect circulating currents in inverter bridge 210 because shunt R57 is open circuited during periods when only one of power switches 110 is conducting.

As an example of the operation of inverter bridge 210, gate drives 108 drive power switches 110 to connect both the B phase and the C phase to power supply 128 by causing upper switch 216B and lower switch 218C to be in the conducting state. ASIC 104 controls lower switch 218C to pulse width modulate the power being applied to the energized phases. In this example, the unenergized A phase is used for back EMF sensing. FIG. 2A illustrates current flow in inverter bridge 210 immediately at turn-on of switches 216B and 218C. At this instant in time, both switch 216B and switch 218C are in the conducting state and switch 218C will be used for pulse width modulation. Further, a diode recovery current flows through diode 220C before sufficient charge has been removed to establish diode blocking. Both motor winding current and diode recovery current flow through shunt R57.

With respect to the diode recovery current, the flyback diodes 220A–C and 222A–C, each coupled to one of switches 216A–C and 218A–C, generally comprise 1) a heavily doped n type substrate, 2) a lightly doped n- epitaxial layer of specified thickness and 3) a heavily doped p type region. The heavily doped p type region forms the anode of diodes 220A–C and 222A–C. The basic diode pn junction does not require the middle n- epitaxial layer yet the ability to withstand voltage is significantly improved by this lightly doped n- layer. The forward conduction of diode 220A–C and 222A–C is accomplished by the injection of carriers (electrical charge) into the lightly doped region without unduly affecting forward voltage drop when diodes 220A–C and 222A–C are in conduction. At turn-off, a quantity of electrical charge is swept from the lightly doped n- layer to establish current blocking in diodes 220A–C and 222A–C. As the quantity of current being conducted increased, the amount of charge increases to a peak while the voltage remains only a few volts reversed on diodes 220A–C and 222A–C. When sufficient charge has been removed to establish diode blocking, the reverse voltage increases and an additional quantity of charge is required to charge the capacitance of the blocking junction. For these reasons, diode recovery currents flow through inverter bridge 210 at turn-on.

Figure 2C:
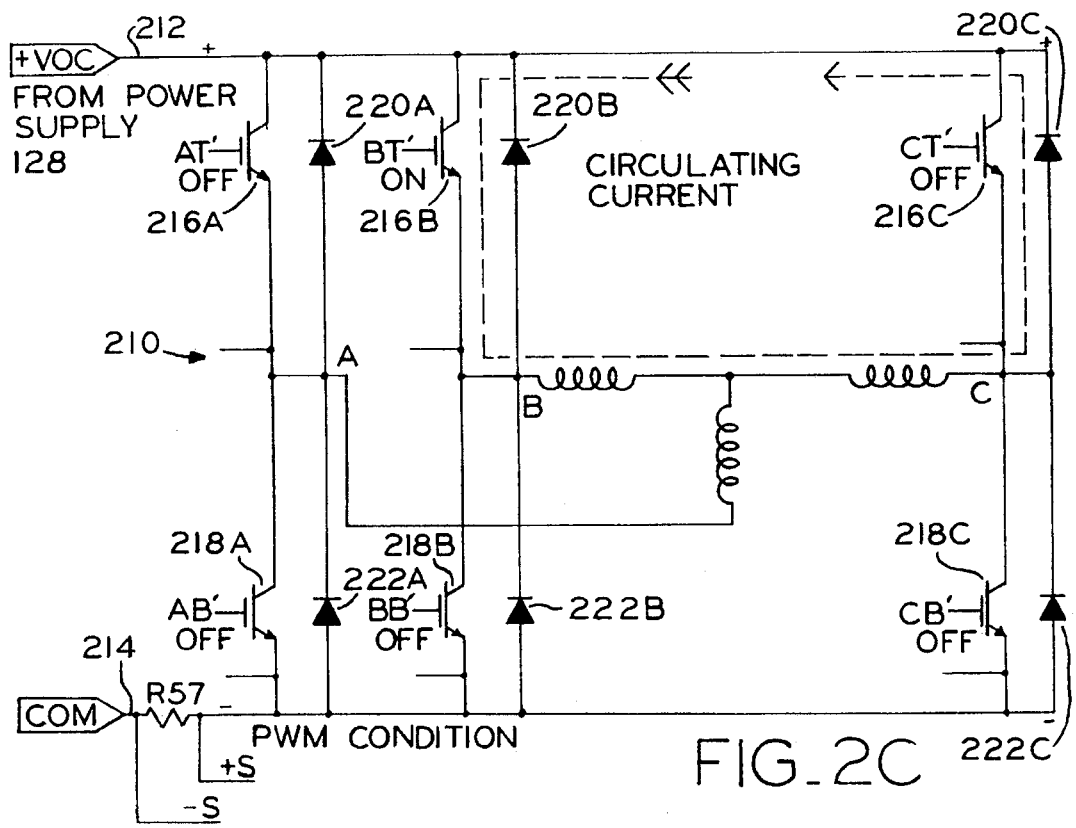

As shown in FIG. 2B, the diode recovery current normally decays and current flows in the B and C windings when switch 216B and switch 218C are conducting. The motor winding current continues to flow through shunt R57. FIG. 2C shows the circulating currents existing when switch 218C is in the nonconducting state. As described above, the PWM control of system 100 turns off one of power switches 110 at a time (lower switch 218C in FIG. 2C) which causes a flyback current to circulate through the conducting power switch (upper switch 216B) and one of the flyback diodes (diode 220C). However, such currents do not flow in rail 214 and, thus, shunt resistor R57 (or similar current sensor) is unable to observe these circulating currents. In normal operation, circulating currents decay rapidly because the motor back EMF opposes their flow. In abnormal operation, however, circulating currents are out of position and the back EMF voltage causes them to increase rather than to decay. A momentary reversal of rotation at start-up or being out of position due to a failure to properly sense rotor position are examples of abnormal operation causing increasing circulating currents.

Generally, circulating currents which have not decayed below a current regulate threshold occur when motor 112 is first started. At start-up, there is as great a likelihood of the rotor position being in advance of the intended field rotation as there is of it being behind. Out-of-position circulating currents are produced when the advancing field forces a reversal in rotor rotation when the rotor has started in a direction opposite to the field rotation. In low power motor drives, such currents are managed by the overcurrent rating in power switches 110 and the permanent magnets (not shown) of motor 112. However, in higher power motor drives, over rating the motor magnets and power switches 110 is not economically feasible.

As described above, direct detection of increasing circulating current by shunt R57 is not possible. However, circulating current is inferred by the response at the turn-on of the PWM power switch (lower power switch 218C in FIG. 2A). The inference is based on the expectation that had the current decayed normally, a period of time after PWM turn-on will be required before the current regulate threshold is reached. If the current regulate threshold is signaled during a period immediately following turn-on, then the fact that the circulating current did not decay and, thus, that an abnormal condition exists, is inferred. For these reasons, the diode recovery current which flows in inverter 210 immediately at turn-on complicates the inference of an out-of-position or otherwise abnormal circulating current in system 100.

Figure 2D:
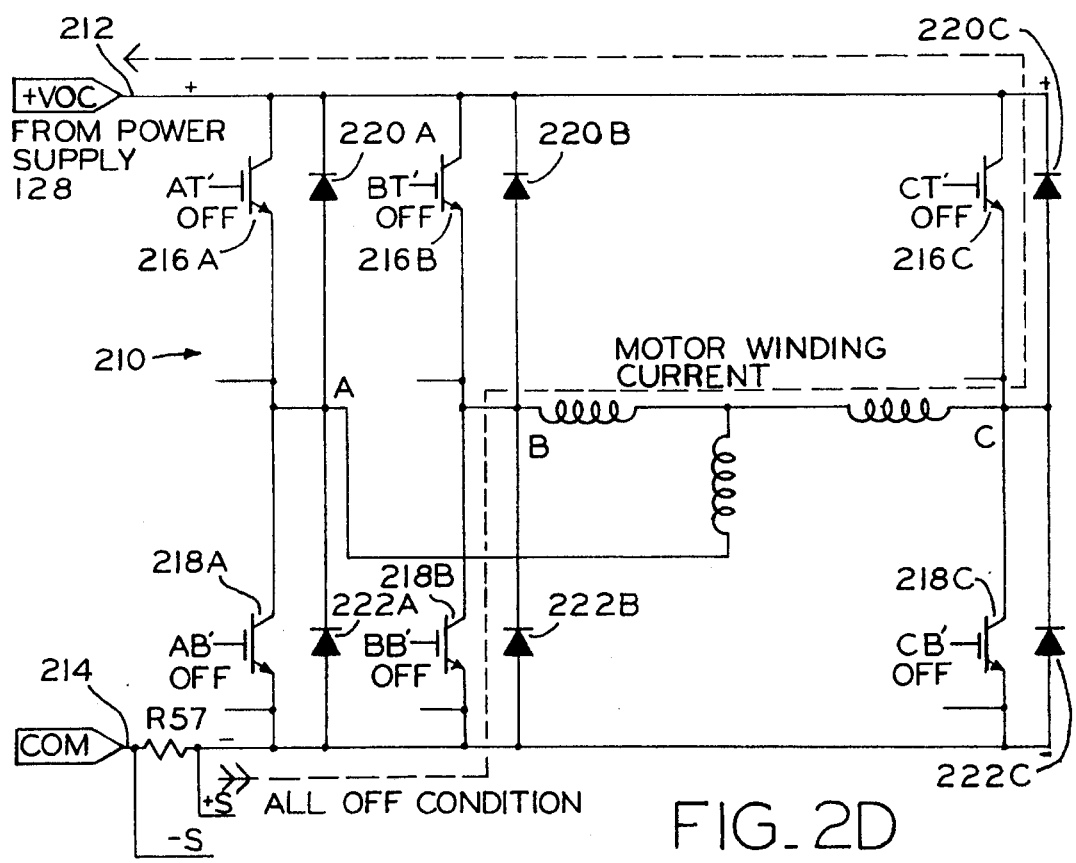

FIG. 2D illustrates current flowing back to power supply 128 from the windings when each of power switches 216A–C and 218A–C are not conducting. If both of upper switches 216A–C and lower switches 218A–C are turned off, then the currents in the windings are forced through two flyback diodes (diodes 222B and 220C), shunt resistor R57 and a bulk capacitor (not shown) connected across rails 212 and 214. Current passes through shunt R57 in the reverse direction until all of the energy stored in the windings is extracted. Since the current through shunt R57 is now of an opposite polarity, voltage across shunt R57 from −S to +S is essentially positive. Therefore, abnormal circulating currents are reduced to an acceptable level.

Figure 3:
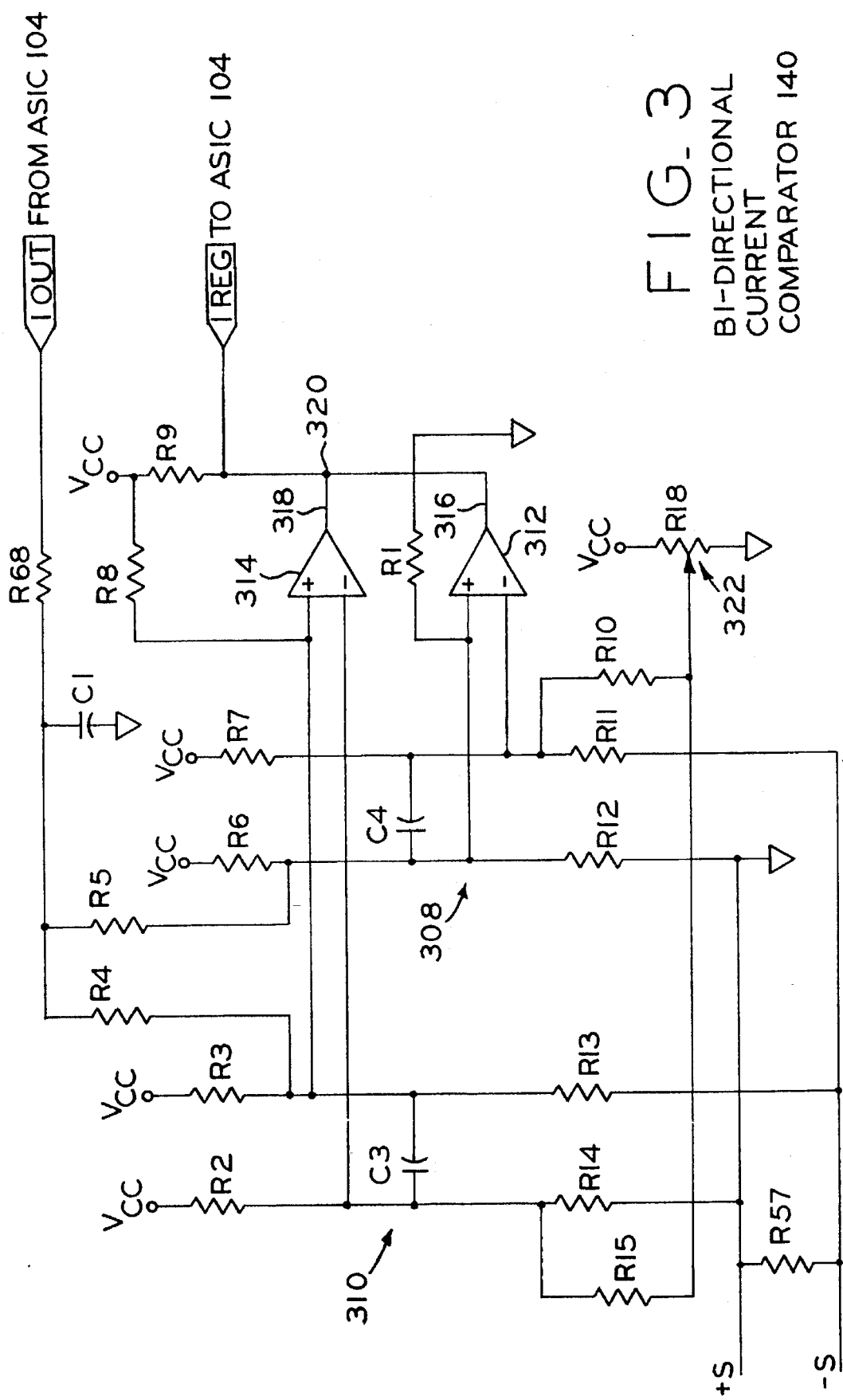
FIG. 3 is a schematic diagram of the bi-directional current comparator circuit of FIG. 1 according to the invention.

FIG. 3 illustrates bi-directional current comparator circuit 140 in detail including a pair of resistor-capacitor networks 308 and 310 for effecting control of peak current. Bi-directional comparator 140 senses the peak current reference command 1OUT provided by ASIC 104. The signal 1OUT is a variable duty cycle signal representative of the peak current or torque requirement of motor 112. As described above, voltage is developed across shunt resistor R57 by current supplied to the windings of motor 112. In this manner, system 100 senses motor phase currents by the current flowing through shunt resistor R57 when power is being exchanged from power supply 128 to motor 112 and vice versa.

A pair of comparators 312 and 314 respond to the normal currents delivered from the bulk capacitor to motor 112 as well as to the reverse currents supplied from the motor inductance back to the bulk capacitor when both upper power switches 216A–C and lower power switches 218A–C are first turned off. As shown in FIGS. 2A–D, +S and −S define the positive and negative directions of current in shunt R57. The divider networks 308 and 310 bias the comparators 312 and 314 into a common mode range. Resistors R6, R7, R11 and R12 and a capacitor C4 form divider network 308. Similarly, resistors R2, R3, R13 and R14 and a capacitor C3 form divider network 310. When resistors R4 and R5 are pulled positive, networks 308 and 310 are upset in a direction so that an increase in the absolute current in shunt R57 (negatively for comparator 312 and positively for comparator 314) to cause a low transition of the connected outputs 316 and 318 of comparators 312 and 314, respectively. In other words, the voltage at −S is more negative with respect to common for positively directed currents or the voltage at −S is more positive with respect to common for negatively directed currents. Likewise, when resistors R10 and R15 are pulled positively, networks 308 and 310 are upset in a direction requiring a decrease in the absolute current in shunt R57 to cause a high to low transition of the connected outputs 316 and 318.

Outputs 316 and 318 are commonly connected at a node 320 and provide a signal IREG to ASIC 104 representative of an overcurrent condition. Preferably, IREG is logic level low when current in shunt R57 exceeding the current regulate threshold. System 100 regulates circulating current in motor 112 by turning off power to each of the windings in response to IREG being low during a predetermined window of time (described in detail with respect to FIG. 4).

FIG. 3 further illustrates a potentiometer 322 including a resistor R18 for adjusting the maximum current threshold value through the adjustment afforded by the resistors R10 and R15. The potentiometer 322 acts to calibrate bi-directional comparator 140 by setting a maximum current magnitude. Comparators 312 and 314 signal that absolute shunt current has exceeded the peak regulate current threshold by a low voltage output at 316 and 318 (IREG low). In response to a low IREG signal during the predetermined window of time, each of power switches 110 are nonconducting until the overcurrent condition is reduced. In a preferred embodiment, each of power switches 110 are nonconducting for at least a predetermined amount of time in response to the abnormal circulating current condition.

As described above, system 100 essentially infers the existence of abnormal circulating currents when an overcurrent condition exists in a period of time immediately following turn-on of power switches 110. However, a PWM circuit also contends with a momentary delivery of current to shunt R57 due to the diode recovery current. The diode recovery current, caused by the forced turn-off of the flyback recovery diodes 220A–C and 222A–C protecting power switches 216A–C and 218A–C, exceeds the instantaneous circulating current by a substantial amount. Thus, diode recovery current being added to the winding immediately at turn-on, even when the winding current has decayed, complicates the inference of abnormal circulating currents. The conventional means for preventing an incorrect response, namely a false indication of abnormal circulating currents, is a combination of capacitor filtering on the input and output of a current comparator.

As described in detail below, system 100 advantageously exempts a predetermined interval of time (approximately 10 microseconds) from observation of shunt R57 immediately following the PWM transistor (power switch 218C) being turned on as an alternative to heavily filtering current comparator 140. A timed blanking interval at the turn-on of the PWM period is designed to ignore the output of current comparator 140 until a sufficient time has elapsed for diode recovery current to decay. If the sensed current still exceeds the threshold value at the conclusion of the predetermined blanking interval and during the predetermined window, then a condition exists requiring that both power devices (upper switch 216B and lower switch 218C) be turned off to bring the current under control. In this respect, current regulation is achieved by turning off all of power switches 110 rather than just one as would be the response for normal PWM operation and abnormal circulating currents are reduced.

Referring further to FIG. 3, the determination that circulating currents exceed the current regulate threshold is also complicated by electrical noise present in every switch mode power circuit. The differential mode capacitors C3 and C4 assist in the filtering of electrical noise in comparator circuit 140. Advantageously, capacitors C3 and C4 are fewer in number, locations and of lesser value than the capacitors which would otherwise be necessary if the purpose was filtering diode recovery current.

Figure 4:
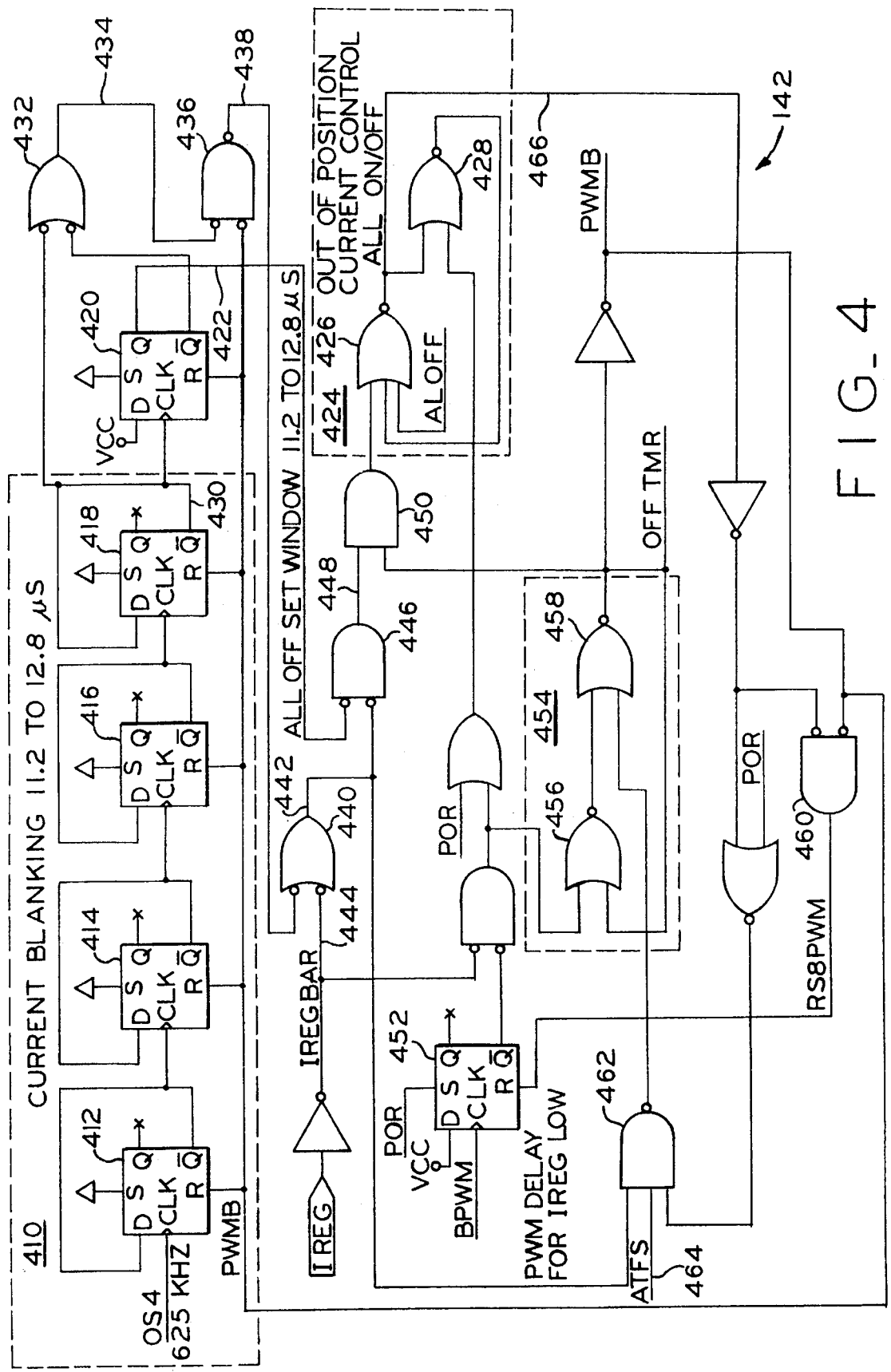
FIG. 4 is a schematic diagram of the control circuit of FIG. 1, including a blanking circuit, according to the invention.

FIG. 4 illustrates a preferred embodiment of control circuit 142 including a ripple counter 410 for timing the blanking interval. Preferably, the blanking interval is predetermined to be 11.2 to 12.8 microseconds in duration to allow the normal decay of diode recovery current. The ripple counter 410 is comprised of D flip flops (DFF) 412, 414, 416 and 418 and is preferably clocked at 625 kHz by a clock signal OS4 input to DFF 412. At the end of the diode recovery current blanking interval, a DFF 420 initiates a window of time (ALL OFF SET WINDOW) for setting an ALL OFF condition. Only during the ALL OFF SET WINDOW does the acknowledgment of a low IREG signal from current comparator 140 initiate the ALL OFF condition commanding each of power switches 110 to be nonconducting. By defining the window, counter 410 constitutes a timing circuit for defining preset periods during which each of the power switching devices 110 may be nonconducting. Preferably, the window is equal in duration to the diode recovery current blanking interval because the DFF 420, which is an extension to ripple counter 410, causes ripple counter 410 to count twice.

In the embodiment illustrated in FIG. 4, DFF 420 provides the ALL OFF SET WINDOW via line 422. An RS flip flop (RSFF) 424 comprised of NOR gates 426 and 428 stores ALL ON/OFF status. The blanking interval terminates when the output signal of DFF 418 goes low at line 430 which in turn causes the output of a gate 432 to go high at line 434. The high output at line 434 causes the output of a gate 436 to go high at line 438, thus, signaling the end of the predetermined blanking interval. In this manner, a gate 440 is free to reflect at line 442 the inverse of IREGBAR. The signal IREGBAR is input to the gate 440 at line 444 and represents the inverse of the IREG signal output from bi-directional current comparator 140. Thus, the output of gate 440 at line 442 represents the IREG signal when a logic level high is present at line 438.

Preferably, control circuit 142 further includes a gate 446 which permits the ALL ON/OFF status of RSFF 424 to be reset during the time that the output of DFF 420 at line 422 remains low (the ALL OFF SET WINDOW). In other words, the gate 446 has a high output via line 448 when the IREG signal is low during the ALL OFF SET WINDOW. An AND gate 450 ensures that the race between a subsequent low IREG signal, a high PWMB signal and reset of DFF 420, is not falsely seen as a condition to reset the ALL ON/OFF status of RSFF 424. The PWMB signal represents the inverse of the PWM signal.

RSFF 424 sets the ALL ON/OFF status by a power-on-reset signal POR or by a high IREG signal along with the storage in a DFF 452 of a begin PWM signal BPWM. In a preferred embodiment of the invention, the BPWM signal commands the beginning of a commutation sequence and is generated either by the timing out of an off timer circuit (not shown) or by commutation to the next winding. The off timer circuit is preferably included in ASIC 104 and regulates the current in the windings of motor 112 as a function of the peak current reference value 1OUT by turning off power to each of the windings for a predetermined amount of time based on the interval between zero crossings.

FIG. 4 further illustrates an RSFF 454 embodying a PWM latch. The RSFF 454 is comprised of NOR gates 456 and 458. As described above, the DFF 452 stores the request to begin PWM. DFF 452 clears the stored BPWM signal when both the ALL ON/OFF status latch (RSFF 424) and the PWM latch (RSFF 454) acknowledge this request through a gate 460. Under specific conditions, a signal ATFS may be input to a gate 462 at line 464 to force the PWM latch (RSFF 454) to be reset. The PWM latch (RSFF 454) is also reset by a low ALL ON/OFF status at line 466 or a low IREG signal after completion of the diode recovery current blanking interval. The PWM latch (RSFF 454) is set similarly to the ALL ON/OFF status latch (RSFF 424) by a high IREG signal along with DFF 452 storing the BPWM signal.

The inverse PWM signal PWMB provides a reset to ripple counter 410 for the time that current drive of motor 112 is turned off either due to a PWM off condition or an ALL OFF condition. When PWMB is low, the one of power switches 110 being pulse width modulated turns on (e.g., lower power switch 218C in FIG. 2B). Further, ripple counter 410 re-initiates timing of the diode recovery current blanking interval in response to PWMB being low. In this manner, ripple counter 410 synchronizes the Dianking interval with the beginning of the PWM on condition.

Figure 5B:
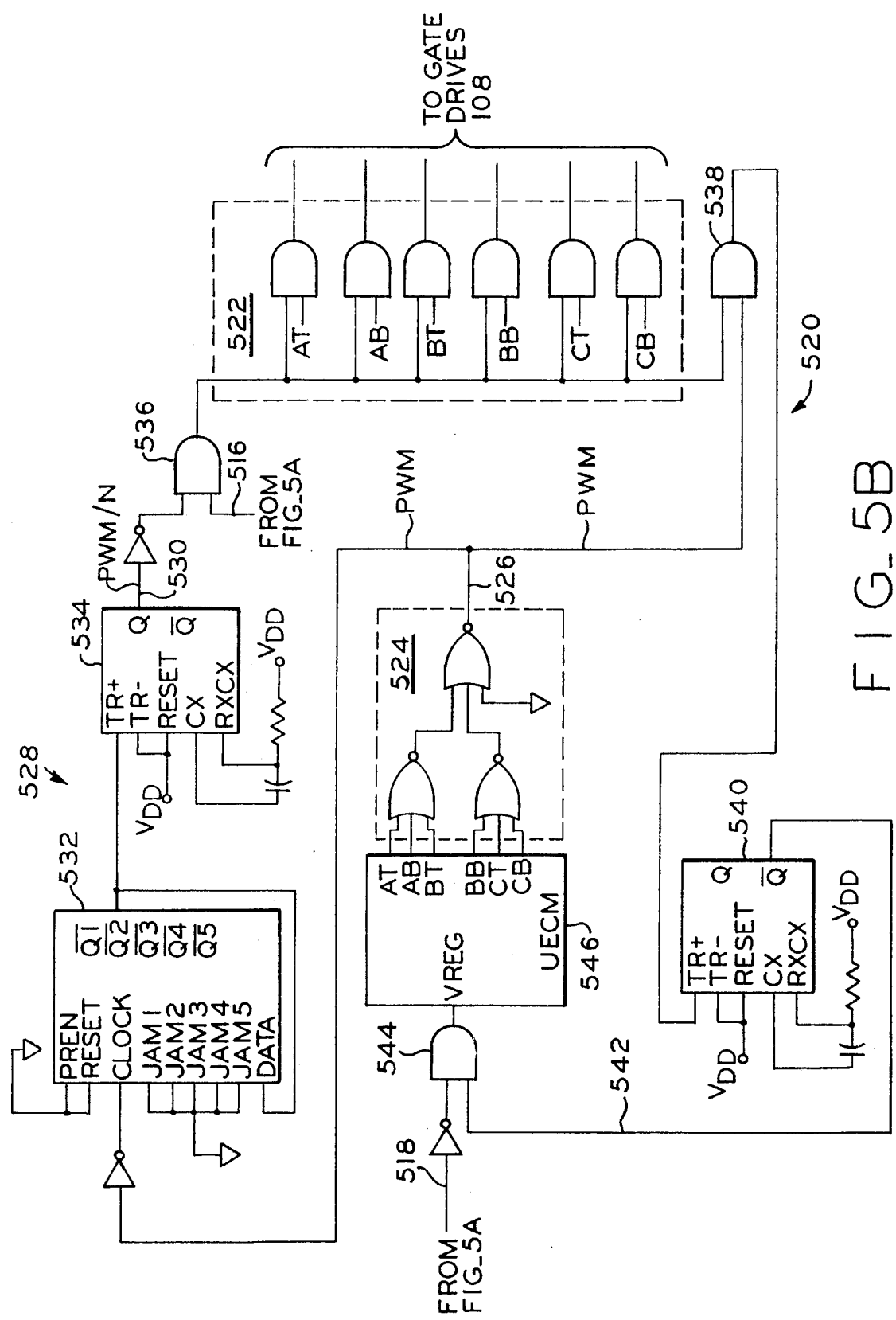

FIGS. 5A–B shows another embodiment of the present invention in block and schematic diagram form. Shunt R57 detects current flowing in the windings of motor 112 when one of upper switches 216A–C and one of lower switches 218A–C are conducting or when both of these devices are turned off and force reverse current through two of flyback diodes 220A–C and 222A–C, the bulk capacitor and shunt R57. As shown in FIG. 5A, a bi-directional comparator circuit 510 senses current from power supply 128 and sets a negative current limit threshold with a comparator 512 and a positive current limit threshold with a comparator 514. The comparators 512 and 514 have outputs at lines 516 and 518, respectively. In this embodiment, comparator 514 detects a current limit when the current in shunt R57 is in the normal positive direction and indicates a positive overcurrent condition with a low output signal at line 518. Likewise, comparator 512 detects a current limit when the current in shunt R57 is in the negative direction and indicates a negative overcurrent condition with a low output signal at line 516. As described above, an overcurrent condition in shunt R57 in the positive direction does not necessarily indicate increasing circulating currents due to an abnormal operating condition. When the positive direction current exceeds the current regulate threshold during the ALL OFF SET WINDOW, one can infer that the overcurrent condition is due to abnormal circulating currents. The presence of abnormal circulating currents can also be inferred from the magnitude of reverse currents flowing in shunt R57 when both conducting devices of power switches 110 are first turned off. However, if all of power switches 110 are turned off each time an overcurrent condition is detected in the positive direction, performance will be degraded. That is, the peak-to-peak ripple current in the winding will increase so that the average current will decrease for a given peak current. Additionally, switching loss in the power devices will increase.

According to this alternative embodiment of the invention, the number of gate turn-off events during pulse width modulation is counted after detection of a positive current exceeding the current regulate threshold. For example, if upper switch 216B is normally conducting and lower switch 218C is being pulse width modulated, additional control circuitry 520 counts the turn-offs of both devices in the current carrying path (switches 216B and 218C). All of power switches 110 are then periodically caused to be in the nonconducting state for regulating current.

Referring to FIG. 5B, the output of bi-directional comparator 510 is input to a drive enable/disable circuit 522 which can disable all of gate drives 108 simultaneously after n turn-off events following detection of a positive overcurrent condition. In this preferred embodiment, a logic translation circuit 524 comprised of a NOR-NOR network decodes the gate signals to a single PWM signal at line 526. A divide-by-n circuit 528 constitutes a timing circuit which counts the number of PWM turn-offs, and outputs a short duration pulse via line 530 every n turn-offs. In the embodiment illustrated in FIG. 5B a counter, such as a shift register 532, and a one-shot circuit 534 constitute the divide-by-n circuit 528.

The outputs of the one-shot circuit 534 at line 530 and bi-directional comparator 510 at line 516 are input to the drive enable/disable circuit 522 through an AND gate 536.

In turn, drive enable/disable circuit 522 disables all of gate drives 108 for turning off each of power switches 110 simultaneously after n turn-off events when either the PWM/n signal is high or the negative limit control signal from comparator 512 is low (indicating an overcurrent condition in the negative direction). An AND gate 538 in combination with another one-shot circuit 540 provide a signal indicating with gate drives 108 are re-enabled by an acceptable condition on the current limit circuits of bi-directional comparator 510. The signal via line 542 is input to an AND gate 544 along with the output of comparator 514 inverted. The gate 544 in turn provides an input signal to a UECM 546 at a voltage regulation pin VREG. The UECM 546 generates signals for controlling gate drives 108 for switching power switches 110. The overall result of this divide-by-n strategy is that the performance of motor 112 will not degrade as much as it would if both conducting power switches 110 were turned off after each PWM stroke (the n=1 case). Also, protection from abnormal circulating currents is achieved without having continuous knowledge of the motor winding currents.

Preferably, n is an integer determined as a function of the acceptable amount of time that system 100 can be blind to circulating currents. This time depends on parameters associated with motor 112 that regulate the rise time of the currents in the windings, such as the winding resistance, winding inductance, and the back EMF. For example, if the PWM period is 50 microseconds, and a designer of system 100 thinks that trouble can occur in 225 microseconds, then the disabling sequence preferably occurs after no more than four PWM periods. In this example, n is set to be less than or equal to four.

Referring again to FIG. 4, yet another embodiment of the invention combines the features of the preferred embodiment of FIG. 1 and the preferred embodiment of FIGS. 5A–B. As shown in FIG. 4, an input ALOFF to RSFF 424 provides a signal for resetting the ALL ON/OFF status latch (RSFF 424). For example, the ALOFF signal represents an overcurrent, overvoltage, underspeed or other condition for which turning off power switches 110 may be required. In the alternative, the ALOFF signal represents a PWM/n signal and ASIC 104 performs the divide-by-n strategy described above with respect to FIGS. 5A–B. In this embodiment of the invention, ASIC 104 counts the number of PWM turn-off events by counting the number of high pulses of the PWMB signal. Thus, ASIC 104 performs the functions of logic translation circuit 524, divide-by-n circuit 528 and drive enable/disable circuit 522.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A motor comprising:

a stationary assembly and a rotatable assembly in magnetic coupling relation thereto, said stationary assembly including windings adapted to be energized in at least one preselected sequence;

a power supply link for connecting the windings to a power supply, said power supply link including power switching devices for selectively energizing the windings in the preselected sequence by selectively connecting the power supply link to the windings to produce an electromagnetic field for rotating the rotatable assembly, said power switching devices each having a conducting state and a nonconducting state and comprising an inverter bridge, said inverter bridge having a positive rail and a negative rail supplied by the power supply; and a current regulation circuit including:

a timing circuit for defining periods during which each of the power switching devices may be nonconducting;

a current sensing circuit for sensing current in only one of the rails of the power supply link; and a control circuit for controlling the power switching devices so that each of the power switching devices is nonconducting only during portions of the defined periods during which the sensed current exceeds a peak current reference level.

2. The motor of claim 1 wherein the current sensing circuit comprises a shunt resistor for sensing current in only one of the rails of the power supply link.

3. The motor of claim 1 wherein the current sensing circuit comprises a bi-directional current comparator for comparing the sensed current in the power supply link to a positive peak current reference level when the sensed current is positive and for comparing the sensed current in the power supply link to a negative peak current reference level when the sensed current is negative.

4. The motor of claim 3 further comprising a network for scaling the sensed current input to the current comparator.

5. The motor of claim 3 further comprising a circuit for generating the peak current reference level and including an adjustable resistor network having an adjustable resistance for varying the peak current reference level.

6. The motor of claim 1 wherein each of the power switching devices is nonconducting for an interval of time when the sensed current exceeds the peak current reference level during the defined periods whereby current which circulates during periods when only one power switching device is conducting is reduced.

7. A motor comprising:

a stationary assembly and a rotatable assembly in magnetic coupling relation thereto, said stationary assembly including windings adapted to be energized in at least one preselected sequence;

a power supply link for connecting the windings to a power supply, said power supply link including power switching devices for selectively energizing the windings in the preselected sequence by selectively connecting the power supply link to the windings to produce an electromagnetic field for rotating the rotatable assembly, said power switching devices each having a conducting state and a nonconducting state; and a current regulation circuit comprising:

a current sensing circuit for sensing current in the power supply link and for generating an overcurrent signal in response to the sensed current exceeding a peak current reference level;

a timing circuit for defining periods during which each of the power switching devices may be nonconducting, said timing circuit comprising a current blanking circuit for inhibiting the overcurrent signal during a blanking interval triggered by the energization of the windings; and a control circuit for controlling the power switching devices so that each of the power switching devices is nonconducting in response to the overcurrent signal whereby the power switching devices are nonconducting during the defined periods except during the blanking interval.

8. The motor of claim 7 wherein the power switching devices comprise an inverter bridge having a positive rail and a negative rail supplied by the power supply and including a free-wheeling diodes each corresponding to and connected across one of the power switching devices, and wherein the rails of the power supply link normally carry a diode recovery current at energization, the blanking interval exceeding an interval of time corresponding to a time period during which the diode recovery current decays below a level.

9. The motor of claim 7 wherein the current blanking circuit comprises a blanking interval counter triggered by the energization of the windings for timing the blanking interval, said blanking interval counter generating a blanking signal for inhibiting the control circuit during the blanking interval.

10. The motor of claim 9 wherein the control circuit comprises an RS flip flop responsive during the defined periods to the overcurrent signal for generating a control signal for controlling the power switching devices so that each of the power switching devices is nonconducting, the blanking interval counter providing the blanking signal and a window signal that defines the defined periods to the RS flip flop whereby during the defined periods the RS flip flop generates the control signal in response to the overcurrent signal except during the blanking interval.

11. The motor of claim 7 wherein the defined periods during which each of the power switching devices may be nonconducting includes a first period of approximately 20 microseconds beginning with the energization of the windings and wherein the blanking interval is approximately one half of the first period.

12. The motor of claim 1 wherein the control circuit controls the power switching devices so that each of the power switching devices is nonconducting when the sensed current exceeds a negative peak current reference level during the defined periods and further comprising a pulse width modulation circuit for pulse width modulating the power being provided to at least one of the windings at a duty cycle having alternating on and off periods, said timing circuit defining the defined periods to be a predetermined number of off periods after the sensed current exceeds a positive peak current reference level.

13. The motor of claim 12 wherein the timing circuit comprises a counter for counting the predetermined number of off periods.

14. The motor of claim 12 wherein the predetermined number is a positive integer greater than 1.

15. A motor comprising:
a stationary assembly and a rotatable assembly in magnetic coupling relation thereto, said stationary assembly including windings adapted to be energized in at least one preselected sequence;
a power supply link for connecting the windings to a power supply, said power supply link including power switching devices for selectively energizing the windings in the preselected sequence by selectively connecting the power supply link to the windings to produce an electromagnetic field for rotating the rotatable assembly, said power switching devices each having a conducting state and a nonconducting state; and
a current sensing circuit for sensing current in the power supply link;

a current blanking circuit for inhibiting the sensed current for a blanking interval triggered by the energization of the windings; and
a control circuit for defining a first period during which each of the power switching devices may be nonconducting and for controlling the power switching devices so that each of the power switching devices is nonconducting when the sensed current exceeds a peak current reference level during the first period except during the predetermined blanking interval whereby current which circulates during periods when only one power switching device is conducting is reduced.

16. The motor of claim 15 wherein the power switching devices comprise an inverter bridge including a positive rail and a negative rail supplied by the power supply and wherein the current sensing circuit comprises a shunt resistor for detecting current in the one of the rails of the power supply link.

17. The motor of claim 16 wherein the inverter bridge includes free-wheeling diodes, each corresponding to one of the power switching devices, and wherein the shunt resistor normally carries a diode recovery current at energization, the blanking interval exceeding an interval of time corresponding to a time period during which the diode recovery current decays below a level threshold.

18. The motor of claim 15 wherein the current blanking circuit comprises a blanking interval counter triggered by the energization of the windings for timing the blanking interval, said blanking interval counter generating a blanking signal for inhibiting the control circuit during the blanking interval.

19. The motor of claim 18 wherein the current sensing circuit generates an overcurrent signal in response to the sensed current exceeding the peak current reference level and wherein the control circuit includes an RS flip flop responsive during the first period to the overcurrent signal for generating a control signal for controlling the power switching devices so that each of the power switching devices is nonconducting, the blanking interval counter providing the blanking signal and a window signal that defines the first period to the RS flip flop whereby during the first period the RS flip flop generates the control signal in response to the overcurrent signal except during the blanking interval.

20. The motor of claim 15 wherein the first period is approximately 20 microseconds beginning with the energization of the windings and wherein the blanking interval is approximately one half of the first preset period.

21. The motor of claim 15 wherein each of the power switching devices is nonconducting for an interval of time when the sensed current exceeds the peak current reference level during the first period.

22. The motor of claim 15 wherein the control circuit defines a second period during which each of the power switching devices may be nonconducting and controls the power switching devices so that each of the power switching devices is nonconducting when the sensed current exceeds a negative peak current reference level during the second preset period and further comprising a pulse width modulation circuit for pulse width modulating the power being provided to at least one of the windings at a duty cycle having alternating on and off periods, said control circuit defining the second preset period to be a predetermined number of off periods after the sensed current exceeds a positive peak current reference level.

23. The motor of claim 22 further comprising a counter for counting the predetermined number of off periods.

24. The motor of claim 22 wherein the predetermined number is a positive integer greater than 1.

25. The motor of claim 22 wherein the current sensing circuit comprises a bi-directional current comparator for comparing the sensed current in the power supply link to the positive and negative peak current reference levels.

26. The motor of claim 25 further comprising a network for scaling the sensed current input to the current comparator.

27. The motor of claim 25 further comprising a circuit for generating the positive and negative peak current reference levels and including an adjustable resistor network having an adjustable resistance for varying the positive and negative peak current reference levels.

28. A motor comprising:
- a stationary assembly and a rotatable assembly in magnetic coupling relation thereto, said stationary assembly including windings adapted to be energized in at least one preselected sequence;
- a power supply link for connecting the windings to a power supply, said power supply link including power switching devices for selectively energizing the windings in the preselected sequence by selectively connecting the power supply link to the windings to produce an electromagnetic field for rotating the rotatable assembly, said power switching devices each having a conducting state and a nonconducting state and comprising an inverter bridge, said inverter bridge having a positive rail and a negative rail supplied by the power supply;
- a pulse width modulation circuit for pulse width modulating the power being provided to at least one of the windings at a duty cycle having alternating on and off periods;
- a counter circuit for counting a predetermined number of off periods;
- a current sensing circuit for sensing current in one of the rails of the power supply link; and
- a current regulation circuit for controlling the power switching devices so that each of the power switching devices is nonconducting in response to the sensed current exceeding a first peak current reference level only after the predetermined number of off periods is counted whereby current which circulates during periods when only one power switching device is conducting is periodically reduced.

29. The motor of claim 28 further comprising a counter for counting the predetermined number of off periods.

30. The motor of claim 28 wherein the predetermined number is a positive integer greater than 1.

31. The motor of claim 28 wherein the current sensing circuit comprises a shunt resistor for sensing current in only one of the rails of the power supply link.

32. The motor of claim 28 further comprising a timing circuit for defining a first period during which each of the power switching devices may be nonconducting, said timing circuit defining the first period to be the predetermined number of off periods after when the sensed current exceeds the first peak current reference level, said current regulation circuit controlling the power switching devices so that each of the power switching devices is nonconducting when the sensed current exceeds a second peak current reference level during the first period.

33. The motor of claim 32 wherein the current sensing circuit comprises a bi-directional current comparator for comparing the sensed current in the power supply link to the first and second peak current reference levels.

34. The motor of claim 33 further comprising a network for scaling the sensed current input to the current comparator.

35. The motor of claim 33 further comprising a circuit for generating the first and second peak current reference levels and including an adjustable resistor network having an adjustable resistance for varying the first and second peak current reference levels.

36. A motor comprising:
- a stationary assembly and a rotatable assembly in magnetic coupling relation thereto, said stationary assembly including windings adapted to be energized in at least one preselected sequence;
- a power supply link for connecting the windings to a power supply, said power supply link including power switching devices for selectively energizing the windings in the preselected sequence by selectively connecting the power supply link to the windings to produce an electromagnetic field for rotating the rotatable assembly, said power switching devices each having a conducting state and a nonconducting state;
- a pulse width modulation circuit for pulse width modulating the power being provided to at least one of the windings at a duty cycle having alternating on and off periods;
- a current sensing circuit for sensing current in the power supply link and for generating an overcurrent signal in response to the sensed current exceeding a peak current reference level;
- a control circuit for defining a period during which each of the power switching devices may be nonconducting;
- a current sensing circuit for sensing current in the power supply link and for generating an overcurrent signal in response to the sensed current exceeding a peak current reference level, said control circuit including a current blanking circuit for inhibiting the overcurrent signal during a blanking interval triggered by the energization of the windings; and
- a current regulation circuit for controlling the power switching devices so that each of the power switching devices is nonconducting in response to the overcurrent signal during the defined period except during the blanking interval and after a predetermined number of off periods whereby current which circulates during periods when only one power switching device is conducting is periodically reduced.

37. The motor of claim 36 wherein the power switching devices comprise an inverter bridge having a positive rail and a negative rail supplied by the power supply and including free-wheeling diodes, each corresponding to one of the power switching devices, and wherein the rails of the power supply link normally carry a diode recovery current at energization, the blanking interval exceeding an interval of time corresponding to a time period during which the diode recovery current decays below a threshold level.

38. The motor of claim 36 wherein the current blanking circuit comprises a blanking interval counter triggered by the energization of the windings for timing the blanking interval, said blanking interval counter generating a blanking signal for inhibiting the control circuit during the blanking interval.

39. The motor of claim 38 wherein the control circuit comprises an RS flip flop responsive to the overcurrent signal for generating a control signal for controlling the power switching devices so that each of the power switching devices is nonconducting, the blanking interval counter providing the blanking signal and a window signal that defines the defined period to the RS flip flop whereby during the defined period the RS flip flop generates the control signal in response to the overcurrent signal except during the blanking interval.

40. The motor of claim 36 wherein the defined period is approximately 20 microseconds beginning with the energization of the windings and wherein the blanking interval is approximately one half of the defined period.

41. The motor of claim 36 wherein each of the power switching devices is nonconducting for a interval of time when the sensed current exceeds the first peak current reference level during the preset period.

42. A method of operating a system for driving a rotatable component, said system comprising a motor having a stationary assembly and a rotatable assembly in magnetic coupling relation thereto, said stationary assembly including windings adapted for energization in at least one preselected sequence, said rotatable assembly in driving relation to the rotatable component, said motor also having a power supply link for connecting the windings to a power supply, said power supply link including power switching devices each having a conducting state and a nonconducting state and comprising an inverter bridge, said inverter bridge having a positive rail and a negative rail supplied by the power supply, said method comprising the steps of:

selectively energizing the windings in the preselected sequence by connecting the power supply link to the windings to produce an electromagnetic field for rotating the rotatable assembly; and regulating current by defining periods during which each of the power switching devices may be nonconducting, sensing current in only one of the rails of the power supply link and controlling the power switching devices so that each of the power switching devices is nonconducting only during portions of the defined periods during which the sensed current exceeds a peak current reference level.

43. A method of operating a system for driving a rotatable component, said system comprising a motor having a stationary assembly and a rotatable assembly in magnetic coupling relation thereto, said stationary assembly including windings adapted for energization in at least one preselected sequence, said rotatable assembly in driving relation to the rotatable component, said motor also having a power supply link for connecting the windings to a power supply, said power supply link including power switching devices each having a conducting state and a nonconducting state, said method comprising the steps of:

selectively energizing the windings in the preselected sequence by connecting the power supply link to the windings to produce an electromagnetic field for rotating the rotatable assembly;

sensing current in the power supply link;

generating an overcurrent signal in response to the sensed current exceeding a peak current reference level;

inhibiting the overcurrent signal during a blanking interval triggered by the energization of the windings;

regulating current by defining periods during which each of the power switching devices may be nonconducting; and controlling the power switching devices so that each of the power switching devices is nonconducting in response to the overcurrent signal whereby the power switching device are nonconducting during the defined periods except during the blanking interval.

44. The method of claim 42 further comprising the steps of pulse width modulating the power being provided to at least one of the windings at a duty cycle having alternating on and off periods and controlling the power switching devices so that each of the power switching devices is nonconducting when the sensed current exceeds a negative peak current reference level during the defined periods, said regulating current step defining the defined periods to be a predetermined number of off periods after the sensed current exceeds a positive peak current reference level.

45. A system comprising:

a rotatable component;

a motor having a stationary assembly and a rotatable assembly in magnetic coupling relation thereto, said stationary assembly including windings adapted to be energized in at least one preselected sequence, said rotatable assembly being in driving relation to the rotatable component;

a power supply link for connecting the windings to a power supply, said power supply link including power switching devices for selectively energizing the windings in the preselected sequence by selectively connecting the power supply link to the windings to produce an electromagnetic field for rotating the rotatable assembly, said power switching devices each having a conducting state and a nonconducting state and comprising an inverter bridge, said inverter bridge having a positive rail and a negative rail supplied by the power supply; and a current regulation circuit including a timing circuit for defining periods during which each of the power switching devices may be nonconducting, a current sensing circuit for sensing current in only one of the rails of the power supply link and a control circuit for controlling the power switching devices so that each of the power switching devices is nonconducting only during portions of the defined periods during which the sensed current exceeds a peak current reference level.

46. An application specific integrated circuit (ASIC) for use with a motor having a stationary assembly and a rotatable assembly in magnetic coupling relation thereto, said stationary assembly including windings adapted for energization in at least one preselected sequence, said motor further having a power supply link for connecting the windings to a power supply, said power supply link including power switching devices for selectively energizing the windings in the preselected sequence by selectively connecting the power supply link to the windings to produce an electromagnetic field for rotating the rotatable assembly, said power switching devices each having a conducting state and a nonconducting state and comprising an inverter bridge, said inverter bridge having a positive rail and a negative rail supplied by the power supply, said ASIC comprising:

a timing circuit for defining periods during which each of the power switching devices may be nonconducting;

a circuit for sensing current in only one of the rails of the power supply link; and a control circuit for controlling the power switching devices so that each of the power switching devices is nonconducting only during portions of the defined periods during which the sensed current exceeds a peak current reference level.

47. A current regulation circuit for controlling excessive circulating currents in a power supply link of a motor having a stationary assembly and a rotatable assembly in magnetic coupling relation thereto, said stationary assembly including windings adapted for energization in at least one preselected sequence, said power supply link connecting the windings to a power supply and including power switching devices for selectively energizing the windings in the preselected sequence by selectively connecting the power supply link to the windings to produce an electromagnetic field for rotating the rotatable assembly, said power switching devices each having a conducting state and a nonconducting state and comprising an inverter bridge, said inverter bridge having a positive rail and a negative rail supplied by the power supply, said current regulation circuit comprising:

a timing circuit for defining periods during which each of the power switching devices may be nonconducting;

a circuit for sensing current in only one of the rails of the power supply link; and a control circuit for controlling the power switching devices so that each of the power switching devices is nonconducting only during portions of the defined periods during which the sensed current exceeds a peak current reference level whereby current which circulates during periods when only one power switching device is conducting is reduced.

48. A method of operating a motor, said motor having a stationary assembly and a rotatable assembly in magnetic coupling relation thereto, said stationary assembly including windings adapted for energization in at least one preselected sequence, said motor also having a power supply link for connecting the windings to a power supply, said power supply link including power switching devices each having a conducting state and a nonconducting state and comprising an inverter bridge, said inverter bridge having a positive rail and a negative rail supplied by the power supply, said method comprising the steps of:

selectively energizing the windings in the preselected sequence by selectively connecting the power supply link to the windings to produce an electromagnetic field for rotating the rotatable assembly;

regulating current by defining periods during which each of the power switching devices may be nonconducting;

sensing current in only one of the rails of the power supply link; and controlling the power switching devices so that each of the power switching devices is nonconducting only during portions of the defined periods during which the sensed current exceeds a peak current reference level.

49. A method of operating a motor, said motor having a stationary assembly and a rotatable assembly in magnetic coupling relation thereto, said stationary assembly including windings adapted for energization in at least one preselected sequence, said motor also having a power supply link for connecting the windings to a power supply, said power supply link including power switching devices each having a conducting state and a nonconducting state, said method comprising the steps of:

selectively energizing the windings in the preselected sequence by selectively connecting the power supply link to the windings to produce an electromagnetic field for rotating the rotatable assembly;

sensing current in the power supply link;

inhibiting the sensed current for a blanking interval triggered by the energization of the windings;

defining a period during which each of the power switching devices may be nonconducting; and controlling the power switching devices so that each of the power switching devices is nonconducting when the sensed current exceeds a peak current reference level during the defined period except during the blanking interval whereby current which circulates during periods when only one power switching device is conducting is reduced.

50. A method of operating a motor, said motor having a stationary assembly and a rotatable assembly in magnetic coupling relation thereto, said stationary assembly including windings adapted for energization in at least one preselected sequence, said motor also having a power supply link for connecting the windings to a power supply, said power supply link including power switching devices each having a conducting state and a nonconducting state and comprising an inverter bridge, said inverter bridge having a positive rail and a negative rail supplied by the power supply, said method comprising the steps of:

selectively energizing the windings in the preselected sequence by selectively connecting the power supply link to the windings to produce an electromagnetic field for rotating the rotatable assembly;

pulse width modulating the power being provided to at least one of the windings at a duty cycle having alternating on and off periods;

counting a predetermined number of off periods;

sensing current in one of the rails of the power supply link; and controlling the power switching devices so that each of the power switching devices is nonconducting in response to the sensed current exceeding a peak current reference level only after the predetermined number of off periods is counted whereby current which circulates during periods when only one power switching device is conducting is periodically reduced.

51. A method of operating a motor, said motor having a stationary assembly and a rotatable assembly in magnetic coupling relation thereto, said stationary assembly including windings adapted for energization in at least one preselected sequence, said motor also having a power supply link for connecting the windings to a power supply, said power supply link including power switching devices each having a conducting state and a nonconducting state and comprising an inverter bridge, said inverter bridge having a positive rail and a negative rail supplied by the power supply, said method comprising the steps of:

selectively energizing the windings in the preselected sequence by selectively connecting the power supply link to the windings to produce an electromagnetic field for rotating the rotatable assembly;

defining by an application specific integrated circuit periods during which each of the power switching devices may be nonconducting;

sensing current in only one of the rails of the power supply link; and controlling the power switching devices so that each of the power switching devices is nonconducting only during portions of the defined periods during which the sensed current exceeds a peak current reference level.

52. A method of regulating current for controlling excessive circulating currents in a power supply link of a motor, said motor having a stationary assembly and a rotatable assembly in magnetic coupling relation thereto, said stationary assembly including windings adapted for energization in at least one preselected sequence, said power supply link connecting the windings to a power supply and including power switching devices for selectively energizing the windings in the preselected sequence by selectively connecting the power supply link to the windings to produce an electromagnetic field for rotating the rotatable assembly, said power switching devices each having a conducting state and a nonconducting state and comprising an inverter bridge, said inverter bridge having a positive rail and a negative rail supplied by the power supply, said method comprising the steps of:

defining periods during which each of the power switching devices may be nonconducting;

sensing current in only one of the rails of the power supply link; and controlling the power switching devices so that each of the power switching devices is nonconducting only during portions of the defined periods during which the sensed current exceeds a peak current reference level whereby current which circulates during periods when only one power switching device is conducting is reduced.

* * * * *